April 27, 1954     K. G. ÅHLÉN     2,676,497
HYDRAULIC TRANSMISSION Filed July 22, 1948                      7 Sheets-Sheet 1

Fig. 1.

INVENTOR
Karl Gustav Åhlén
BY
his ATTORNEY

April 27, 1954   K. G. ÅHLÉN   2,676,497
HYDRAULIC TRANSMISSION

Filed July 22, 1948   7 Sheets-Sheet 4

INVENTOR
Karl Gustav Åhlén
BY
James C. Marble
ATTORNEY

Patented Apr. 27, 1954

2,676,497

UNITED STATES PATENT OFFICE 2,676,497

HYDRAULIC TRANSMISSION

Karl Gustav Åhlén, Stockholm, Sweden, assignor, by mesne assignments, to Jarvis C. Marble, New York, N. Y., Leslie M. Merrill, Westfield, N. J., and Percy H. Batten, Racine, Wis., trustees Application July 22, 1948, Serial No. 40,076

8 Claims. (Cl. 74—732)

The present invention relates to hydraulic power transmissions and has particular reference to such transmissions in which the hydraulic drive embodies a variable speed torque converter for producing an increase in the torque applied to the driven or output element as compared with torque delivered by the engine or other source of power to the input element of the transmission, and in which the torque converting hydraulic drive is employed in the transmission in conjunction with an alternative drive providing a relatively fixed speed ratio between the input and output members of the transmission and which is adapted to be used in alternation with the variable speed torque converting hydraulic drive. More specifically the invention relates to transmissions of the above general character in which the hydraulic torque converting drive is incorporated in the transmission with a positive mechanical drive to be used in alternation and providing a direct drive connection between the driving and driven members of the transmission.

Among the several objects of the invention are: to provide a transmission of the character under consideration in which shifting of the drive from hydraulic to the alternative drive or vice versa may be effected automatically in response to certain predetermined conditions of operation; in which such automatic shift is subject to an overruling control which will permit the shift from one type of drive to the other to be made at the will of the operator when the circumstances are such that such shift does not result in improper or inefficient operation of the transmission under the existing circumstances; to provide improved means whereby such automatic and manual control may be effected without deviation from the normal operating habits of the operator of a vehicle in which the apparatus is installed; to provide improved means whereby the required controls are simply and effectively actuated by a pressure fluid system which advantageously employs as an operating medium the same fluid that is used for operating the hydraulic torque converting system; to provide an improved form of hydraulic torque converter which may operate either as a single rotation converter in which the reaction blade structure is rotationally stationary or as a double rotation converter in which the reaction blading rotates counter to the direction of the pump and with the operation of the converter automatically shifted from single rotation to double rotation, and vice, versa, in accordance with predetermined operating conditions; to provide an improved organization in which the above noted objects may be accomplished in an apparatus which is relatively simple mechanically and which may be incorporated in a design giving relatively very compact overall dimensions so that the apparatus may readily be installed in the comparatively limited space available in automobiles and like automotive vehicles; and to provide other and more detailed improvements in construction and operating characteristics as will hereinafter more fully appear as the specification proceeds.

In order more fully to understand the nature of the invention, its several objects, and the manner in which they may best be obtained, there is set forth in the ensuing portion of this specification a description of different embodiments of apparatus for carrying the invention into effect, to which reference may be had in conjunction with the accompanying drawings forming a part hereof and in which.

Figure 1:
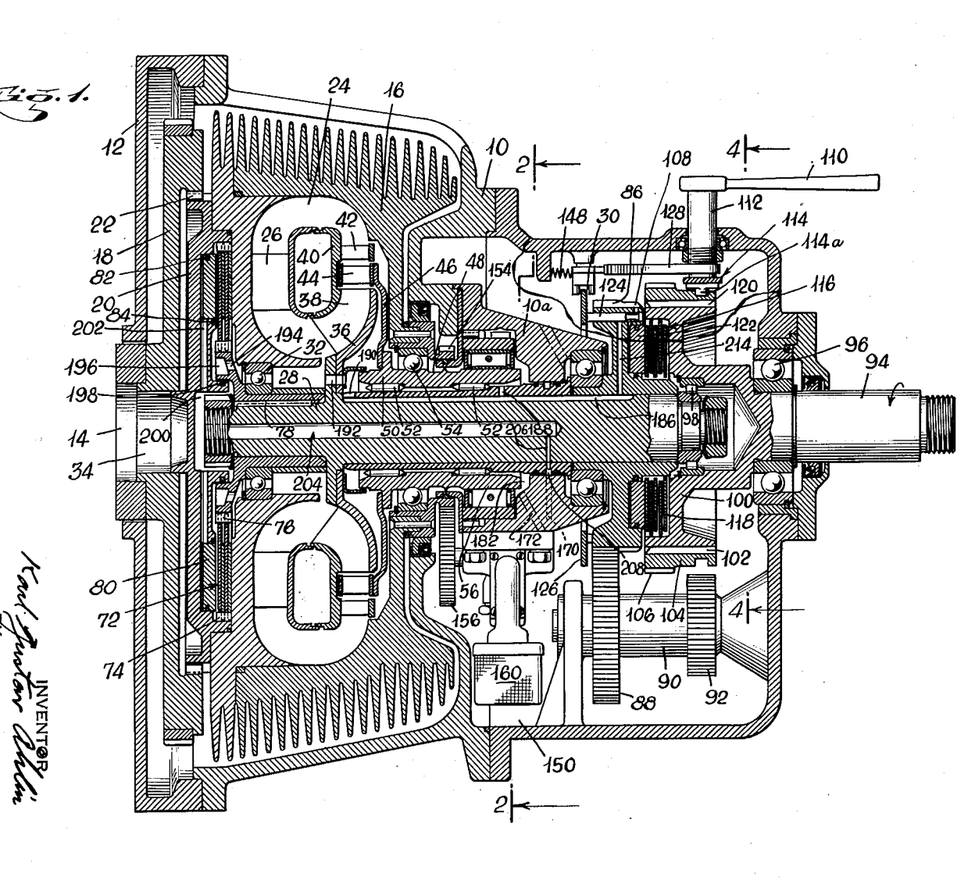
Fig. 1 is a longitudinal central section of a transmission embodying the invention, certain portions of the mechanism in the upper right hand corner of the figure being rotated into the plane of the drawing for purposes of illustration.

Referring now more particularly to Fig. 1 and related figures, the transmission illustrated comprises a rotationally fixed outer housing indicated generally at 10 and adapted to be fixed to the bell housing or other fixed part 12, of, for example, an internal combustion engine, the crank or driving shaft of which is indicated at 14 and which for purposes of the present description may be considered as the power input or driving member. Rotatably mounted within the fixed housing 10 is the rotating converter casing 16 which in the present embodiment is driven through the medium of the engine flywheel 18 fixed to the shaft 14 and a drive element 20 rotationally fixed to the casing 16 and driven from the flywheel through the medium of the meshing teeth or splines 22.

The casing 16 provides a chamber 24 for circulation of the hydraulic working fluid and also carries a ring of pump or impeller blades 26.

An axially central turbine member 28 is carried by a bearing 30 mounted on an internal extension 10a of the fixed housing and bearing 32 carried by the rotating casing 16, the latter being centered radially with respect to the engine shaft and flywheel by means of the annular flange 34 on the element 20 which engages a suitable bore in the flywheel 18.

The turbine element is provided with a disclike portion 36 located in the hydraulic chamber 24 and carrying a row of turbine blades 38 which serve to support an internal ring member 40 which carries a second row of turbine blades 42. Between the rows of turbine blades 42 and 38 a row of reaction or guide blades 44 is supported by the disc-like portion 46 of a reaction member 48 which comprises in part a hollow shaft or sleeve portion 50 concentrically mounted around the shaft part of the turbine member 28 and supported by bearings 52 between the two shaft parts and a bearing 54 between the reaction member and a radially inwardly projecting part of the rotating casing 16.

Figure 2:
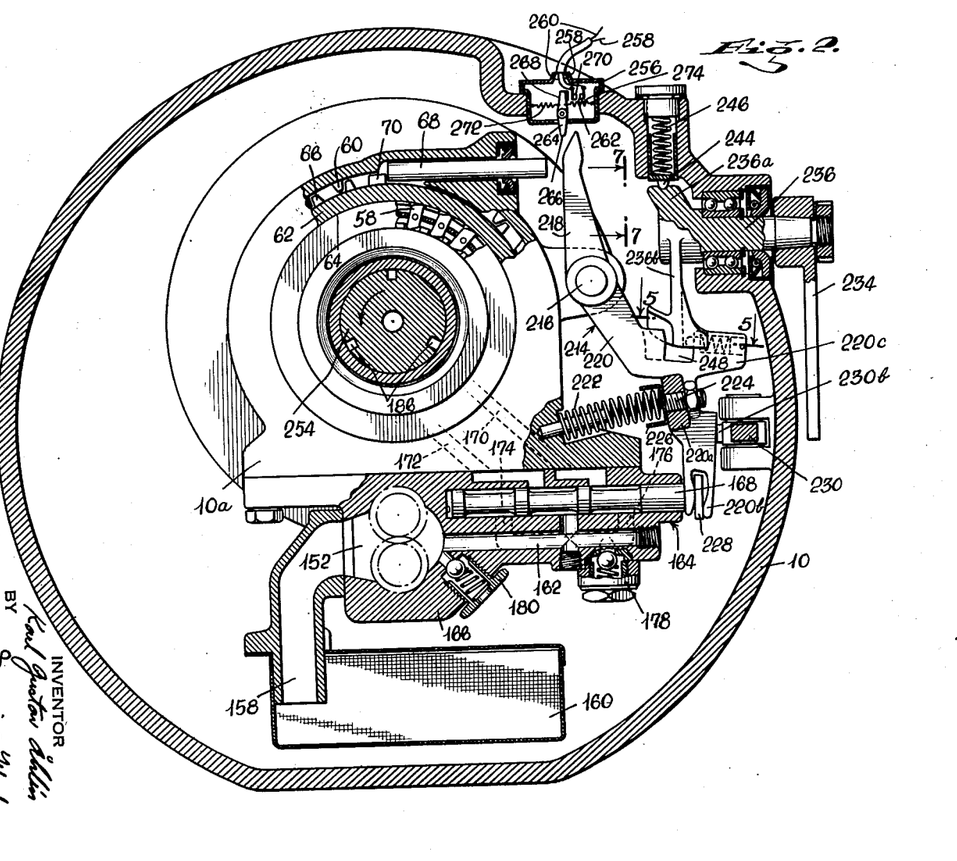
Fig. 2 is a section taken on the line 2—2 of Fig. 1.

The shaft part 50 of the reaction member provides the inner race 56 of a freewheel clutch having engaging elements 58, which may be of blocklike form as shown in Fig. 2 or of the usual roller form acting against cam surfaces. The clutch engaging elements 58 are set so as to engage at times when under the influence of the hydraulic working fluid the reaction member tends to turn counter to the direction of rotation of the pump or driving member.

The inner extension 10a of the fixed housing 10, as seen more clearly in Fig. 2, is formed with a circular recess the wall of which is provided with peripherally spaced internal splines or teeth 60 and between these teeth and the clutch elements 58 there is interposed an annular ring 62 providing the outer race 64 of the overrunning clutch, which is engaged by the elements 58 and which is also provided with spaced externally projecting splines or teeth 66 adapted to intermesh with the splines 60 on the stationary housing member. As will be evident from Fig. 2 the spacing of the splines 60 and 66 in relation to their peripheral width is such as to permit the ring 62 to have limited peripheral movement, with the splines 60 and 66 acting as positive stops for determining the range of this movement.

For purposes to be hereinafter described there is provided an axially shiftable operating pin or rod 68 mounted in the housing part 10a to move in a direction tangent to the circle of the ring 62 and adapted to be actuated by means of a suitable abutment 70 on ring 62.

For effecting a direct mechanical connection between the driving member of the transmission and the turbine member a multiple disc friction clutch indicated generally at 72 is provided. This clutch comprises driving plates 74 rotationally fixed by and axially movable on suitable splines formed internally on the driving element 20 and driven plates 76 rotationally fixed and axially movable on suitable splines formed on a disc part or spider 78 keyed to and in effect forming a part of the turbine member 28. Clutch 72 is engaged by an operating member 80 in the form of an annular plate or piston located in a suitable recess of like configuration in the driving element 20, between which and the plate 80 there are provided suitable packing rings 82 and 84.

In the present embodiment, the transmission is provided with a gear mechanism for transmitting drive positively in either forward or reverse direction from the turbine member and also providing a neutral position. This mechanism, which for convenience will be hereinafter referred to as the reversing gear, embodies a pressure fluid actuated synchronizing clutch which advantageously is operated by the same hydraulic system as that operating the direct drive clutch 72. In order to effect reverse, the turbine member 28 is provided with a gear 86 meshing with gear 88 carried by counter-shaft 90, which also carries gear 92. The tail shaft 94, which is carried by bearing 96 in the stationary housing and by a second bearing 98 between it and the turbine member 28, is provided with a hub portion 100 having external splines 102 on which is slidably mounted the annular reversing ring member 104 provided with teeth 106 adapted to engage a reversing idler gear 93 (Fig. 4) meshing with the counter-shaft gear 92.

A portion of the face of gear 86 on the turbine member is provided with teeth or splines 108 adapted to engage with teeth 106 when the reversing ring member is shifted to a position to the left of that shown in Fig. 1, such shift being effected by means of the reverse lever 110 turnable to rotate the reversing post 112 to which is fixed the shift yoke 114 having projections 114a engaging a suitable groove in the reversing ring 104. When the ring is shifted so that teeth 106 and 108 mesh, a direct forward driving connection is established between the turbine member and the tail shaft. In the position of ring 104 shown in Fig. 1 a neutral is established in which driving connection between the turbine member and the tail shaft is broken. Movement of the reversing ring to the right of the position shown in the figure disconnects the direct driving connection and causes teeth 106 to mesh with the reversing idler gear so that reverse drive to the tail shaft is effected.

Figures 3, 8:
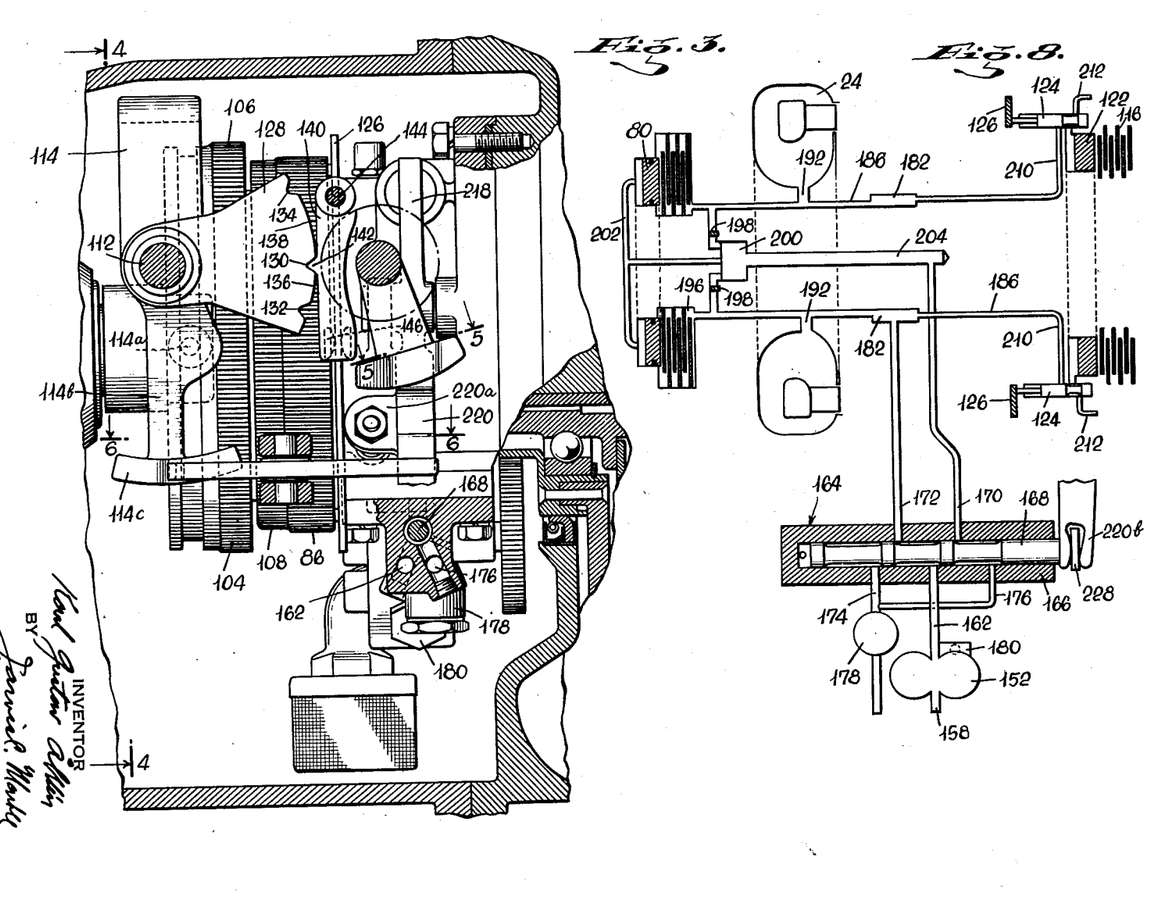
Fig. 3 is a fragmentary section on an enlarged scale with certain parts broken away looking from the right of the transmission as viewed in Fig. 2.
Fig. 8 is a schematic diagram illustrative of the fluid control system of the parts shown in Fig. 1.

Since normally, when in neutral position with the driving member turning, the turbine member 28 is also turning under the influence of the hydraulic drive, it is necessary in order to secure either direct or reverse drive without clashing to synchronize the turbine member with the tail shaft before the meshing teeth are brought into engagement, and for this purpose the pressure fluid actuated synchronizing clutch indicated generally at 116 is provided. The construction of this clutch is in general similar to that of clutch 72, comprising a number of what may be considered driving plates 118 splined on the turbine member and a number of driven plates 120 splined on the outer wall of a recess formed in the hub portion 100 of the tail shaft. A clutch operating member 122 in the form of an annular plate is subjected to the action of pressure fluid in a manner hereinafter to be described, under the control of one or more control valves 124 which are actuated through the medium of a valve actuating ring 126 the position of which is controlled by means of the plates 128 (Fig. 4) fixed to turn with the post 112 and yoke 114. In Fig. 3 one of the plates 128 is more clearly shown and since plates 128 and the parts coacting therewith are duplicates, it will be sufficient to describe but one. Plate 128 is provided with three notches 130, 132 and 134 between which there are cam surfaces 136 and 138. An operating arm 140 provided with a projection 142 adapted to engage the notches in plate 128 is pivoted to the stationary casing on the pin 144 and is provided at its free end with projecting lugs or ears 146 adapted to engage the valve actuating ring 126. The operating arm 140 is held in engagement with the plate 128 by means of spring 148 (Fig. 1).

As will be seen from Figs. 1 and 3, when the reverse lever is in neutral position the projection 142 is engaged in the notch 130 of plate 128. If the lever is moved to engage direct drive the first movement of the lever from neutral lifts the projection 142 out of the notch 130 on to the cam surface 136, thus swinging the arm 140 to the right as seen in Fig. 3 and to the left as seen in Fig. 1, or in other words forwardly with respect to the longitudinal axis of the transmission. This in turn moves the valve ring 126 and the valve or valves 124 in the same direction to admit pressure fluid to the synchronizing clutch operating member 122. This serves to engage the clutch and, assuming the tail shaft to be stationary, acts to bring the turbine member to rest to permit the direct drive engaging teeth to be meshed without clashing. When direct drive position is reached the projection 142 drops into the direct drive notch 132 on plate 128 and under the action of the spring 148 the operating arm 140 is returned to the neutral position in which pressure fluid is cut off from the clutch so that the clutch is disengaged. When the reversing lever is moved from neutral position to reverse position, substantially the same action takes place, the projection on the operating lever 140 being lifted out of the neutral notch and traveling along the cam surface 138 so that the control valve or valves admit pressure fluid to engage the synchronizing clutch until after the reverse gear teeth have been meshed, when the projection 142 drops into the reverse notch 134 to cut off pressure fluid and permit the clutch to disengage.

As previously noted, both clutches 72 and 116 are advantageously controlled by a common hydraulic pressure system which will now be described with reference particularly to Figs. 1, 2, 3 and 8. The stationary housing 10 provides a sump 150 for liquid for operating the hydraulic torque converter and also for the operation of the clutches. A pump 152, preferably of the gear type, is carried by the extension 10a of the stationary housing, this pump being driven by means of gear 154 carried by the rotating casing 16 and meshing with the gear 156 on the pump shaft. Pump 152 draws liquid from the sump through the inlet connection 158, preferably provided with a suitable strainer 160, and delivers fluid under pressure through a discharge conduit 162 to a master control valve indicated generally at 164. This control valve comprises a housing 166 having a cylindrical bore in which is slidably mounted the valve member 168 for controlling flow of pressure fluid discharged from the pump to the conduits 170 and 172, and return flow through conduits 174 and 176, as appears more clearly from the flow diagram of Fig. 8. In the structural embodiment, the pressure conduits 170 and 172 are, as shown in Figs. 1 and 2, formed by suitable bores in the stationary housing extension 10a. The pressure conduit 162 is formed by a bore in the pump housing 166 while the return conduit 176 is formed by a further bore in the housing lying outside the plane of Fig. 2 (see Fig. 3). The conduit 174 is provided by a further bore (Fig. 2) which joins the bore 176 as indicated in the diagram of Fig. 8. Bore 176 is in communication with a spring loaded pressure relief valve 178 while the pressure conduit 162 from the pump is in communication with a second pressure relief valve 180. The spring loads on these two valves are adjusted so that valve 178 will be opened by a lower value of fluid pressure than valve 180 and for the purposes of this description these valves may therefore be referred to respectively as low pressure and high pressure relief valves. As will be seen more clearly from Fig. 1, the pressure conduit 172 communicates with a pressure chamber 182 located between the stationary housing portion 10a and the rotatably mounted turbine and reaction members. The forward end of this chamber is blocked off by a suitable diaphragm member 184 having suitable pressure packed relation with respect to the portion of the rotating casing carrying the pump gear 154 and the shaft portion of the reaction member. The shaft part of the turbine member 28 is provided with one or more longitudinally extending grooves or channels 186 which are placed in communication with the pressure chamber 182 by means of one or more radial holes 188. The hydraulic working chamber 24 is placed in communication with the channels 186 by means of one or more radial openings 190 in the turbine shaft at the forward end of channels 186 and ports 192 passing through the disc portion 36 of the turbine member. Ports 194 in the clutch spider 78 admit pressure fluid to the space 196 between the driven element of the clutch and the driving element 20, there being a piston ring seal 198 between these parts to separate the space 196 from the chamber or space 200 between the driving element 20 and the forward end of the turbine member 28. Space 200 is placed in communication with the recess in which the clutch operating plate moves by means of one or more radially extending bores 202 in the element 20.

An axially central bore 204 in the turbine member 28 communicates at one end with the space or chamber 200, and at its other end communicates with one or more radial bores 206 which extend to the surface of the shaft of member 28 at places peripherally spaced between the axially extending channels 186 in member 28. Bores 206 communicate with an annular external groove 208 on the turbine member which in turn communicates with the conduit 170 leading from the control valve.

The channels 186 of the turbine member extend rearwardly to communicate with radial bores 210 which conduct pressure fluid to the valve chambers in which the control valves 124 are located, these valve chambers being vented by means of passages 212.

The operation of this system under the control of the master valve 164 is as follows, it being assumed that hydraulic working fluid under pressure is being supplied by pump 152 through the conduit 162, the maximum pressure of the fluid being determined by the high pressure relief valve 180. In the position of the control valve shown in Fig. 8 the apparatus is set for hydraulic drive, since the pressure supply conduit 162 is connected by means of conduit 172, chamber 182, channels 186 and ports 190 and 192 with the working chamber 24 of the converter so that the working fluid is maintained in this chamber under a predetermined minimum static pressure, the value of which is governed by the loading of the relief valve 180. The hydraulic fluid under pressure also, through bearing 32 and ports 194, is admitted to the chamber 196 and from this chamber has access to the chamber in which the clutch plates of clutch 72 are located and to one face of the clutch operating member 80. The hydraulic fluid thus operates to separate the clutch plates and also acts on the operating member 80 to retract the latter so that the clutch is disengaged. This is a certain amount of leakage of the pressure fluid past the piston ring seal 198, the leakage fluid flowing to chamber 200 and from there through the bores 204 and 206, groove 208 and conduit 170 to the master valve which in this position of the valve connects conduits 170 and 176, to permit flow of leakage fluid back to the sump. The desired pressure differential between the high pressure fluid and the leakage fluid is maintained by the load on the low pressure relief valve 178 in the return conduit leading back to the sump.

If, now, the master valve is moved to the right from the position shown in Fig. 1, the pressure fluid supply conduit 162 is connected with conduit 170 and through the groove 208 and bores 206 and 204, chamber 200 and bores 202 the fluid is admitted behind the clutch operating plate 80 so that the clutch is engaged and a direct mechanical drive connection established between the power input member and the turbine member for the establishment of direct mechanical drive. A certain amount of pressure fluid leaks from chamber 200 past the piston ring seal 198 to chamber 196, and through ports 194, bearing 32, ports 192 and 190, channels 186 and chamber 182 is returned to the conduit 172, which in the assumed position of the valve member 168 is in communication with the conduit 174 which returns the leakage fluid to the sump, while desired minimum pressure of the leakage fluid is maintained by valve 178. This in turn serves to maintain a desired minimum static pressure in the working chamber 24 of the converter, in which it is desirable to maintain a certain value of static pressure even though the hydraulic mechanism is not in action.

When the master valve is set in the position shown in Fig. 8, which provides for converter drive, the channels 186, as previously explained, are filled with high pressure actuating fluid so that this high pressure fluid is available for engaging clutch 116 to provide synchronization for either direct or reverse drive. The manner in which actuating the control valves 124 by manipulation of the lever 110 has previously been explained and from Fig. 8 it will readily be apparent that if the valves are moved to the left the pressure fluid will be admitted to the clutch operating plate 122 for engaging the clutch. When, as previously explained, the valve are returned to positions corresponding to those shown in Fig. 8 after forward or reverse drive engagement has been effected, the pressure fluid connections 210 are cut off by the valves and the operating chamber of the clutch vented through the relief connections 212. In this connection it is to be noted that whether in forward or reverse drive the clutch rotates and centrifugal force will ordinarily be sufficient to cause the clutch operating fluid to be thrown out of the operating chamber, creating sufficient vacuum to cause disengagement of the clutch plates so that the clutch does not remain engaged when the gear is shifted from a driving position back to its neutral position. Obviously, dished plates or other means such as retracting springs may be employed to insure disengagement of the clutch when engaging fluid is not admitted to it.

It is desirable that reverse drive be obtained only when the transmission is set for hydraulic drive and not for direct mechanical drive. Means to be described later have therefore been provided which insures that the master control valve is always set to the position giving hydraulic drive before the synchronizing clutch can be engaged.

It is characteristic of hydraulic torque converters of the kind under consideration that as the speed of the turbine or driven member approaches that of the pump or driving member the ratio of the secondary torque to the primary torque, which is ordinarily maximum when the turbine member is stalled, decreases until a point is reached where the input and output torques are equal and if the speed of the turbine member relative to the speed of the pump increases beyond this ratio the output torque becomes less than the input torque. Obviously no advantage and considerable disadvantage is involved if the speed of the turbine member relative to that of the pump member is permitted to rise above the value at which no torque increase is obtained and at or before the speed ratio where no torque increase is produced it is desirable to shift from the hydraulic drive to an alternative form of drive which in the present instance is a direct mechanical drive. The ratio at which this change should be made is usually referred to as the shift point of the transmission.

In accordance with one of the aspects of the present invention an automatic control for effecting shift from hydraulic to mechanical drive is provided, and the mechanism by means of which this is effected will now be described.

Referring more particularly to Figs. 2 and 3, a bell crank type of lever 214 is pivoted on a stud 216 carried by the extension 10a of the fixed housing. Lever 214 has an arm 218 located to be contacted and moved by the actuating rod 68 associated with the overrunning clutch which holds the reaction member against counter-rotation. The second arm 220 of lever 214 is provided with a laterally extending lug or ear 220a serving as an abutment for a spring 222 which is held in compression between the lever and in a suitable seat on the housing part 10a. The force exerted by the spring and tending to move the lever 214 in counter-clockwise direction as viewed in Fig. 2 may be varied by turning the stud 224, which is threaded in the ear 220a and which carries the spring retaining cup 226, so as to shorten the length of the spring in any given position of the lever 214.

An extension 220b on arm 220 is provided with a slot engaging the head 228 of the master control valve member 168 so that the latter is actuated by movement of the lever.

In addition to providing for automatic shift from hydraulic to mechanical drive, it is also desirable to enable the operator to overrule the automatic shift so as to be able to effect shift from one type of drive to the other at will, and as has previously been mentioned it is desirable to provide means for preventing engagement of reverse unless the master control valve is set to provide hydraulic drive. To secure this latter function an interlocking mechanism is provided which comprises a lever 230 which is pivotally mounted intermediate its ends on a pin 232 carried by suitable ears on the stationary housing 10. One arm 230a (Fig. 6) is provided with an abutment surface 230b adapted to engage the extension 220b of lever 214. The other arm 230c of lever 230 is provided with a projection 230d. The shift yoke 114 is provided at one side with a depending extension 114b which at its lower end is provided with a transversely extending arcuate arm 114c provided with a cam face comprising two portions 114d and 114e parallel with each other but offset and joined by the cam rise 114f.

Figure 6:
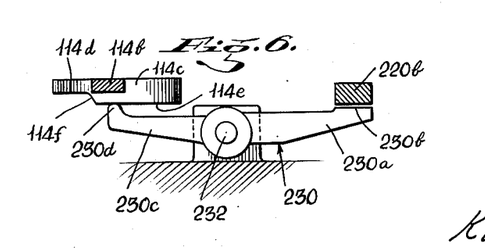
Fig. 6 is a section taken on the line 6—6 of Fig. 3.

With the reversing lever 110 set as shown in Fig. 1 so that the parts are in neutral position, the position of the extension 114b of the yoke 114 is as shown in Fig. 6 so that the projection 230d of lever 230 is in engagement with the cam surface 114e, which holds lever 230 against clockwise turning movement as viewed in Fig. 6 and maintains the abutment surface 230b substantially in contact with the extension 220b on the lever 214. With the parts in these positions it will be seen from Fig. 2 that the lever 214 is prevented from turning counter-clockwise from the position shown in Fig. 2 and with the lever in the position shown the master valve 164 is set to the position which corresponds to that shown in Fig. 8, which as previously described provides hydraulic drive.

If now the lever 110 is shifted to engage reverse, the extension 114c of the shift yoke 114 moves to the left as seen in Fig. 6 so that the projection 230d moves along the cam surface 144e, which operates to continue to hold the lever 214 and the master valve 164 in the same position, thus insuring that the mechanism is set for hydraulic drive if reverse is engaged.

On the other hand, if forward drive is desired the shift yoke is turned in the opposite direction so that the extension 114c moves to the right as seen in Fig. 6 and the projection 232 passes down the cam rise 114f to the cam face 114d. This permits lever 230 to turn clockwise as seen in Fig. 6, the lever 214 then being, so far as lever 230 is concerned, free to move counter-clockwise as seen in Fig. 2 under the influence of the spring 222. Counter-clockwise movement of lever 214 from the position shown in Fig. 2 will operate to shift the master valve to a position providing for direct mechanical drive, so that when the shift yoke is set for forward drive the master valve can be in either of its two positions, depending upon the position of lever 214, the position of the latter, however, being determined under different conditions by other factors hereinafter discussed.

Insofar as the automatic shift from hydraulic to direct drive is concerned, the manner in which the position of lever 214 is shifted to effect this function will later be described, but as previously noted it is desirable to provide a manually controllable overrule mechanism by means of which hydraulic or direct drive can be secured at will, subject to certain limits operative to prevent the operator from overruling the automatic shift to establish direct drive under conditions when such drive should not be employed.

The overrule mechanism comprises an operating lever 234 (Fig. 2) operative to turn an overrule control member indicated generally at 236, rotatably mounted in a suitable bearing carried by the stationary housing 10. Member 236 is provided with an arcuate arm portion 236a provided with notches 238, 240 and 242 (Fig. 7) adapted to be engaged by a position retaining pin 244 resiliently loaded by the spring 246 carried in a suitable bore in the housing 10. An arm 236b is provided which depends from the rotatably mounted post portion of member 236. This arm at its lower end comprises a section 236c lying in a plane normal to the axis of turning movement of the member 236, a section 236d extending obliquely to one side of said plane and a section 236e extending obliquely to the other side of said plane.

The arm 220 of lever 214 is provided with a laterally projecting extension 220c in which there is located a slot 248 through which the arm 236b of member 236 extends. As will be seen more clearly from Fig. 5, the width of the slot 248 is substantially greater than the thickness of the arm 236b to permit lateral movement or play between the parts. Also the arm 220c is provided with a bore for the reception of a spring 250 acting on a pin 252 tending to resiliently hold the arm 236b in spaced relation with respect to the wall 248a of the slot 248.

In the position of the parts as shown in the figures the overrule lever is in its neutral position which will permit freedom of movement of the lever 214 under the influence of the automatic control, provided that the reversing mechanism is not set for reverse drive, which provides the interlock preventing lever 214 from assuming a position under such conditions which will permit of a direct drive connection through the transmission.

Figures 4, 5, 7:
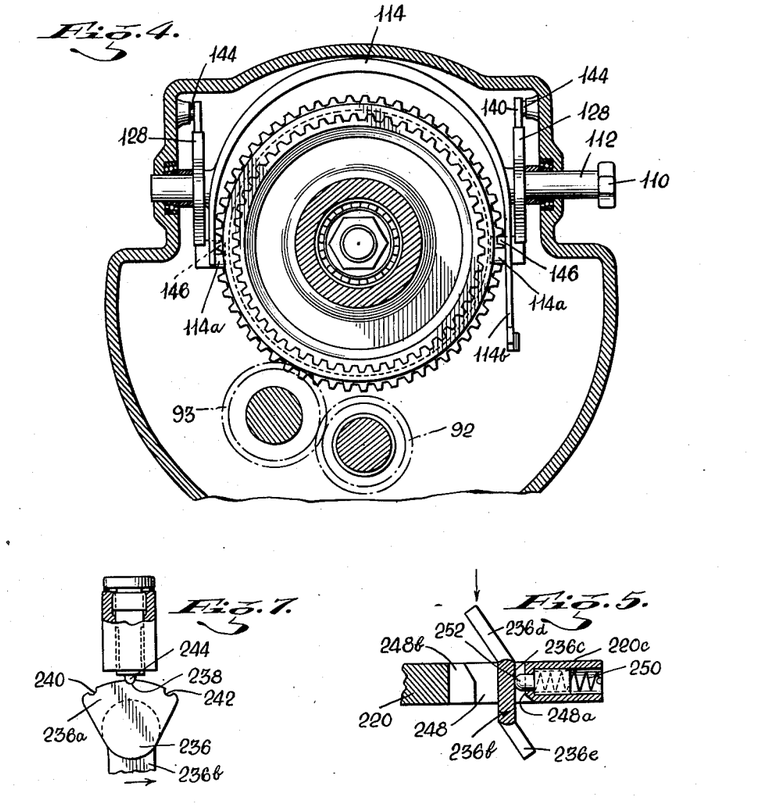
Fig. 4 is a section taken on the line 4—4 of Figs. 1 and 3.
Fig. 5 is a section taken on the line 5—5 of Figs. 2 and 3.
Fig. 7 is a section taken on the line 7—7 of Fig. 2.

If the lever 234 is shifted so as to bring the lever upwardly from the plane of the paper as seen in Fig. 2, the member 236 is turned clockwise as viewed in Fig. 7 to bring the retaining pin 244 into the notch 242, and the arm 236b is moved downwardly as viewed in Fig. 5 to bring the section 236d into contact with the wall 248b of the notch 248 in lever 214. This provides a positive mechanical lock preventing movement of lever 214 in counterclockwise direction from the position seen in Fig. 2 and consequently insures positioning of the master valve 164 so that the mechanism is set for hydraulic drive.

If, on the other hand, the lever 234 is turned downwardly behind the plane of Fig. 2 the reverse action takes place, the pin 244 being shifted into the notch 240 and the arm 236b being moved upwardly as seen in Fig. 5 to bring the oblique section 236e into contact with the pin 252 so as to resiliently move the lever 214 in counter-clockwise direction and shift the valve 164 to the position effecting direct drive.

As previously described, the interlocking lever 230 prevents movement of lever 214 in counter-clockwise direction from the position shown in Fig. 2, to effect direct drive positioning of valve 164, if the mechanism is set for reverse drive. Consequently, the manual overrule mechanism must be provided with a safety interlock which will prevent the overrule from shifting the mechanism to direct drive position if the reversing mechanism is engaged in reverse position. This safety interlock is provided by the spring 250 and the resiliently loaded pin 252.

If for example it is assumed that the reverse gear mechanism is in either neutral position or reverse position the projection 230b on lever 230 will be in the position shown in Fig. 2 and will prevent counter-clockwise movement of lever 214 from the position shown in Fig. 2, which would shift the control valve to direct drive position. If under the assumed condition, it were attempted by means of the overrule mechanism operated by lever 234 to shift to direct drive this would not be possible since the resultant movement of the arm 236b upwardly as seen in Fig. 5 to bring the section 236e in contact with pin 252 would merely result in retracting pin 252 against the pressure of spring 250, without resulting movement of lever 214. If this resilient connection, which in effect under certain conditions constitutes a lost motion connection, were not employed, damage or breakage of the parts might be caused by the cam action of the section 236e attempting to shift a member in a direction prevented by the abutment formed by the projection 230b on lever 230.

The operation of the above described apparatus is as follows. In the position of the parts shown in the figures and assuming the apparatus to be driven by a conventional righthand engine, the direction of rotation of the pump and turbine elements will be counter-clockwise in Fig. 2 as indicated by the arrow 254. Since the reverse gear parts are in neutral position the lever 214 is held in the position of rotation shown in Fig. 2 by the action of spring 222 and that of the abutment 230b which limits the counter-clockwise movement of the lever under the influence of the spring.

Since no torque is transmitted under the assumed conditions, the reaction member of the converter will also tend to rotate in counter-clockwise direction as seen in Fig. 2, this movement being permitted by the action of the over-running clutch. Due to the unavoidable friction in the clutch even when overrunning, the outer clutch ring 62 will be moved counter-clockwise to one of its limit positions determined by the engagement of the splines 60 and 66. In this position of the parts there is a certain amount of axial clearance or play for movement of the actuating rod 68 which may for example be in the position shown in Fig. 2 or with one of its ends abutting against the lever arm 218, with clearance between the rod 68 and abutment 70 on ring 62.

If now the gearing is shifted so as to engage for forward drive the extension 114b on the shift yoke 114 is shifted to permit the abutment 230d to move from the cam surface 114e to the cam surface 114d. This permits the abutment 230b to move to the right as seen in Fig. 2 and further permits counter-clockwise movement of lever 214 from the position seen in Fig. 2 under the influence of spring 222 so as to take up the play between the lever arm 218 and the abutment 70, between which parts the operating rod 68 is held in compression. For the purposes of describing the present action it is further assumed that the overrule lever 234 is in neutral position so as to have no influence on the automatic action, lever 214 being able to move counter-clockwise from the position shown in Fig. 2 insofar as the overrule mechanism is concerned due to the clearance in the slot 248.

If it is assumed that the vehicle is standing still with the reversing gear in neutral position and with engine idling, a shift to engage forward drive will operate first to stop rotation of the turbine member of the converter. With this member stationary, reaction torque will be applied to the reaction member by the working fluid being circulated in the converter and this torque will operate, through members 62 and 68 to maintain lever 214 in the position shown in Fig. 2, against the action of spring 222, even though the lever 214 is free to turn counter-clockwise from the position shown so far as any stop provided by abutment 230b is concerned. Thus, under starting conditions for forward drive, valve 164 is held in the position determining hydraulic drive by the action of reaction torque instead of by a positive mechanical lock of the kind which is effected when the mechanism is set for reverse drive.

As long as sufficient power is being transmitted through the hydraulic circuit and further as long as the ratio between the speeds of the driving and driven members of the hydraulic mechanism is such that appreciable torque multiplication is being effected, the hydraulically applied reaction force on the reaction member, acting through the overrunning clutch and the movable ring 62, will maintain the latter in its terminal position which holds the lever 214 and valve 164 in positions maintaining hydraulic drive. However, if and when the speed of the turbine member relative to the pump or driving member rises to a ratio such that no torque increase is accomplished by the hydraulic mechanism, at which time no reaction torque would be applied to the reaction blades ending to turn them counter to the direction of the pump and turbine, spring 222 acts to turn lever 214 counter-clockwise and shift the control valve 164 to its position effecting shift to direct drive. If it is desired to have the shift from hydraulic to direct drive automatically made exactly at the theoretical shift point where the torque ratio between input and output is exactly one to one, then the tension of spring 222 should be set so that it exerts only enough force to overcome the frictional resistance of moving the valve 164 and shifting the ring 62 from one to the other of its terminal positions. In some instances it may be desirable to have the automatic shift to direct drive effected while there is still some increase in torque effected by the hydraulic drive. This may readily be effected by increasing the tension of spring 222 so that it is sufficient not only to overcome the friction necessary to effect the shift but also to shift the ring 62 in counter-clockwise direction as seen in Fig. 2 before the value of the hydraulically applied reaction force acting on the reaction blades and tending to turn the ring 62 in clockwise direction as seen in Fig. 2 drops to zero.

With the apparatus set for forward drive so that either hydraulic or direct drive is available in accordance with operating conditions, it may be desirable to shift from hydraulic drive to direct drive when the speed of the turbine member relative to that of the pump member is lower than that required to effect the automatic shift. This is accomplished by the overrule mechanism the operation of which will be generally understood from the previous description. If direct drive is desired at a time when the automatic control leaves the mechanism in hydraulic drive the overrule lever is depressed as seen in Fig. 2 to bring the section 236e of the arm 236b into contact with the pin 252 and turn the lever 214 counter-clockwise so as to move the control valve 168 to the right as seen in Fig. 2 and shift to direct drive. This overrule ability should not, however, be available under conditions where high values of torque are required to be transmitted through the tail shaft, since to make such a shift under such conditions might readily result in excessive wear on the direct drive clutch and/or stalling of the engine. This limitation on the overrule is also provided by the spring loaded pin 252 which prevents setting the mechanism for direct drive when the gearing is set in either neutral or reverse position. If under the assumed running conditions the overrule is shifted to direct drive position the section 236e acting on pin 252 has to move the lever 214 counter-clockwise not only against the resistance of the control valve which must be shifted but must also turn lever 214 against the existing reaction resistance applied to the ring 62 and the operating rod 68. Consequently, depending upon the strength of the spring 250 in relation to the reaction resistance exerted through the operating rod 68, the manual overrule for shifting to direct drive may be effective or ineffective. If the degree of torque multiplication and the resulting hydraulically applied reaction is too high to warrant shifting to direct drive, then the force required to shift lever 214 will be more than can be effected through the spring 250 and instead of the overrule member moving lever 214 it will merely operate to retract the pin 252. On the other hand, if a shift to direct drive is warranted, the hydraulic reaction, resisting movement of the lever 214, will be insufficient to compress spring 250, so that movement of the overrule member will move the lever and the control valve to the direct drive position.

For return from direct to hydraulic drive the overrule mechanism is employed, the overrule lever being turned so as to be lifted out of the plane of Fig. 2, causing the section 236 of the arm 236b to engage lever 214 and shift the control valve 164 to the hydraulic position. Depending upon the nature of the control desired, many different arrangements may be employed for effecting this under the control of the operator, as for example by suitable interconnection with the engine throttle or with the brake pedal of a vehicle.

The shift point at which it is desirable to change from hydraulic to direct drive occurs usually when the ratio of turbine speed to pump speed is of the order of 0.7 or less and when the shift is made to direct drive this ratio is changed to a one to one ratio. This change in the ratio requires either that the engine speed by slowed down to the tail shaft speed or the latter accelerated to the engine speed, or a combination of both, and this change may under certain circumstances produce a noticeable surge in the operation of a vehicle or other drive. In order to eliminate or diminish any noticeable surge occurring when shift is made, the power and speed of the engine may momentarily be decreased at the instant of shift, as for example by means of an auxiliary throttle or an overrule mechanism acting momentarily on the main throttle or by a momentary ignition cut out. Such an arrangement requires an impulse operative at the time when shift is made, and the present arrangement may if desired include means for providing such an impulse as is more or less diagrammatically shown in Fig. 2. As shown in this figure the casing 10 carries a switch mechanism indicated generally at 256 for delivering the desired impulse through a circuit indicated by the wires 258 and 260. In the embodiment illustrated, wire 258 terminates in a fixed contact 262 while the wire 260 is connected to a pivoted lever 264 having a projecting arm 266 adapted to be contacted and moved by the end of the lever arm 218. The other arm 268 of lever 266 is resilient and provided with a contact 270 located to make contact with the contact 262 when the lever is turned clockwise as viewed in the figure. The lever is biased to neutral position by springs 272 and 274.

When shift is made from hydraulic to direct drive the end of the lever arm 218 moves to the left as seen in Fig. 2 and contacts the lever arm 266 to momentarily turn the lever and close the electrical circuit to provide an impulse for momentarily reducing the engine speed in any desired manner. This impulse is only momentary since the lever 218 passes the lever arm 266 which is returned to neutral position by the springs 272 and 274. When shift is made from direct drive to hydraulic drive no decrease of input speed is required, even momentarily. When this shift is made the lever arm 218 moves to the right and passes the lever arm 266, momentarily turning the lever counter-clockwise, which movement, however, has no effect on the electrical circuit.

In order to obtain relatively high stall torque characteristics with the minimum number of rows of blading, and a rapid rise in efficiency of operation of the converter as the turbine or driven shaft accelerates from stall, it may be desirable to provide what may be termed a double rotation type of converter in which the reaction blading, instead of being rotationally fixed, is mounted so as to be able to rotate in a direction counter to that of the pump, the counter-rotating blading being mechanically connected to the forwardly rotating turbine member by suitable gearing so as to apply additional output torque to the driven shaft of the device. The range of relative speed between the driving and driven members over which the double rotation type of converter is efficient is comparatively limited as compared with the efficient speed range of a single rotation converter in which the guide or reaction blades are held stationary, and it has heretofore been proposed to provide a converter structure in which both double rotation and single rotation operation may be obtained, the converter operating in the low speed range as a double rotation converter and shifting to single rotation operation in the higher speed range.

As in the previously described relation between single rotation converter operation and direct drive, there is also a shift point which occurs at a certain speed relation between the input and output members of a converter of the double rotation type, at which shift should be made from double rotation operation to single rotation operation or vice versa, and in another of its aspects the present invention contemplates the provision of improved automatic means for effecting this shift between double rotation and single rotation operation.

Figure 9:
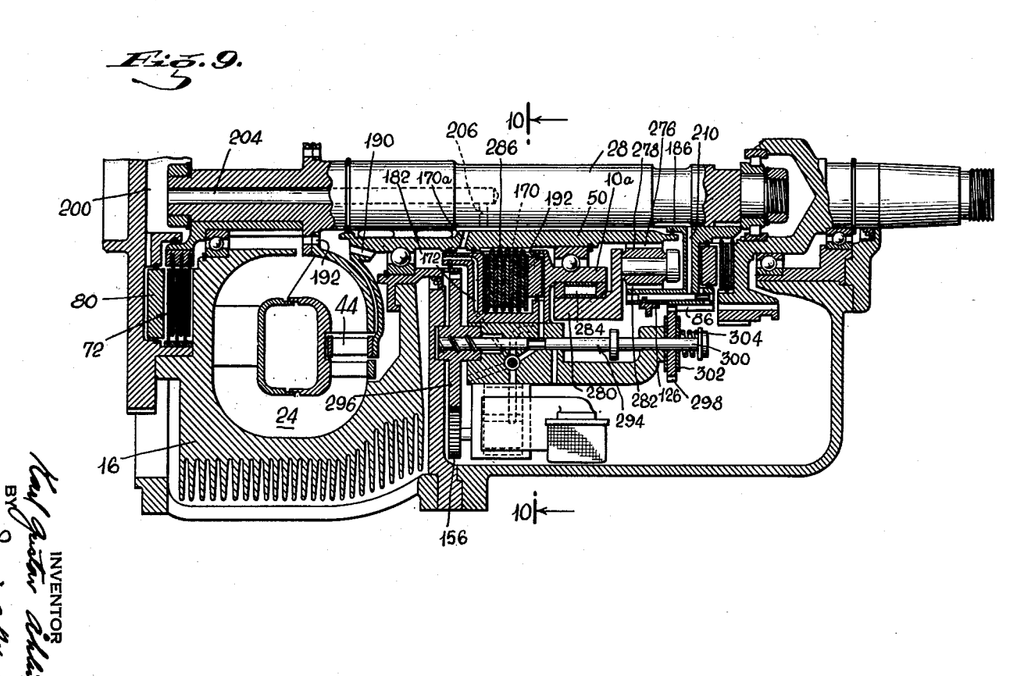
Fig. 9 is a longitudinal central half section of another form of transmission embodying the invention.
Figure 10:
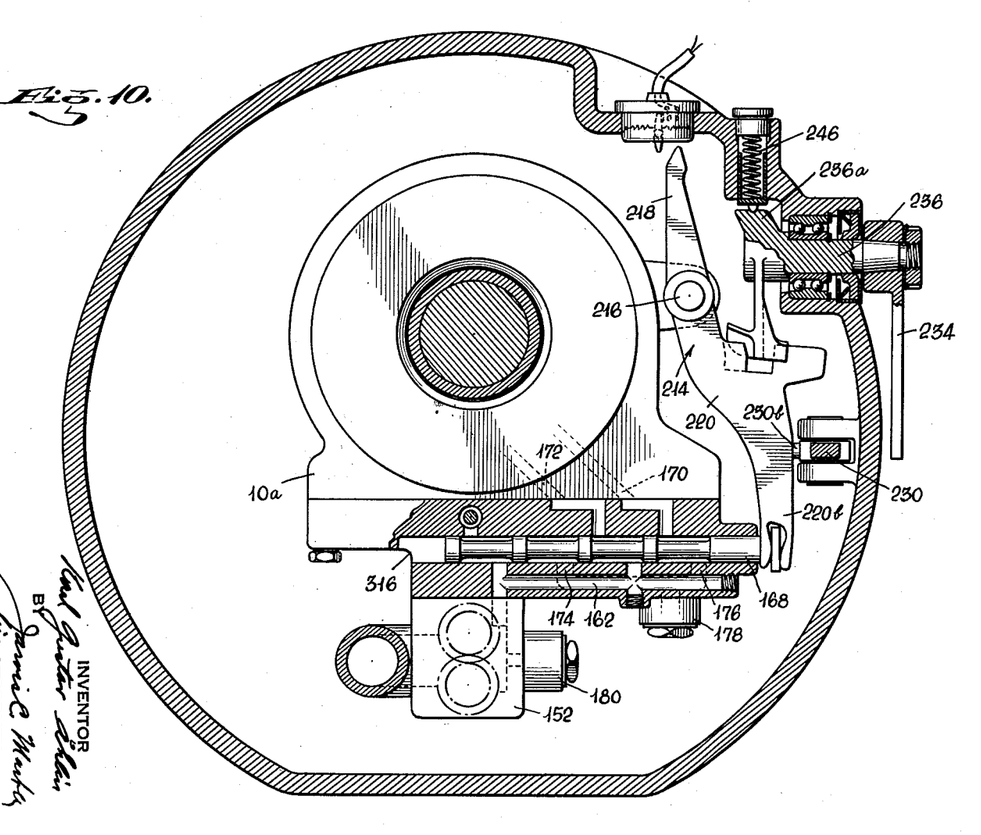
Fig. 10 is a section taken on the line 10—10 of Fig. 9.
Figure 11:
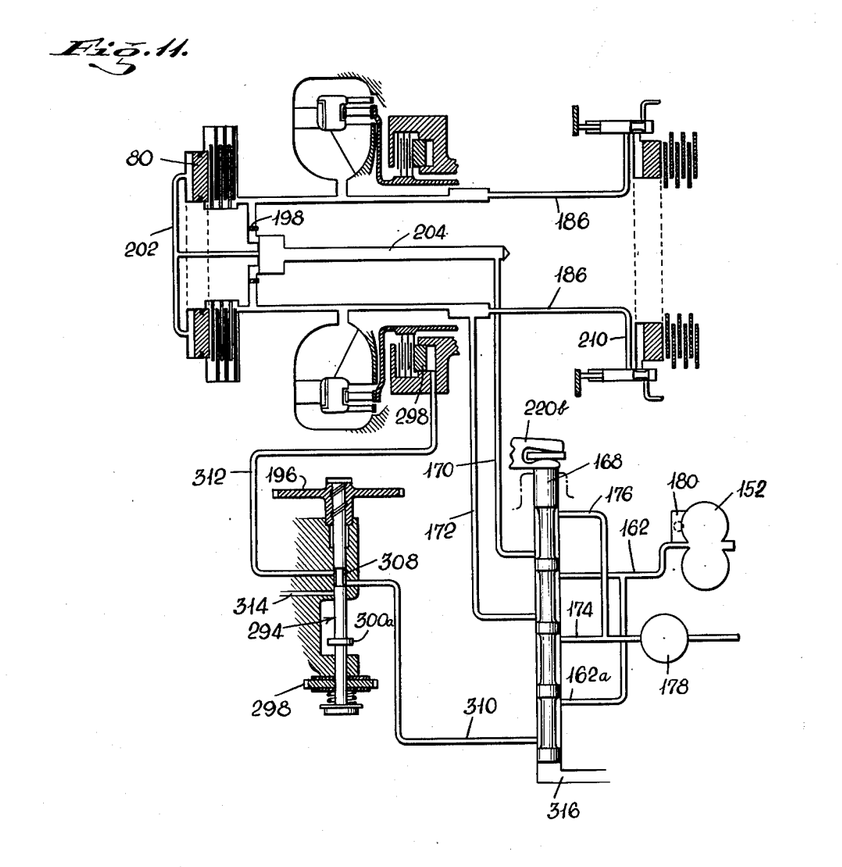
Fig. 11 is a schematic diagram similar to Fig. 8 showing the control system of the transmission shown in Fig. 9.

The manner in which this is accomplished may best be understood by reference to Figs. 9, 10 and 11, illustrative of one embodiment of apparatus for carrying this phase of the invention into effect. Referring now more particularly to Fig. 9 the construction illustrated comprises a double rotation type of converter provided with means for effecting direct drive, the general nature of construction being generally similar to the construction previously described in connection with the embodiment shown in Fig. 1 and related figures, like or equivalent parts bearing the same reference numerals.

In the present construction the sleeve portion 50 of the reaction member is provided at its rearward end with a gear 276 constituting the sun gear of a planetary gear train having planets 278 mounted on a planet carrier 280 and meshing with a ring gear 282 formed on the turbine member 28. Between an extending sleeve portion of the carrier 280 and a similar sleeve portion of the stationary casing part 10a there is located an automatic one-way or overrunning brake comprising engaging elements 284 arranged to permit the planet carrier 280 to rotate freely in the same direction as the pump and to prevent its rotation in counter-direction. A locking brake, indicated generally at 286 and in the form of a fluid pressure actuated multiple disc device similar to clutch 72, is provided for locking the reaction member to the stationary housing. This brake comprises a series of plates 288 splined on the reaction member sleeve 50 and a second series of plates 290 splined on the stationary housing part 10a. Operating member 292 located in a suitable recess in the stationary part 10a is adapted to be actuated by pressure fluid supplied under the control of the master valve member 168 and an automatic shift valve indicated generally at 294, the position of which is determined by the speed of the turbine member relative to that of the pump member, through the medium of what may be termed a quotient regulating mechanism. This mechanism includes a gear 296 interposed between the pump driving gear 154 on the rotating casing 16 and the pump gear 156, and a gear 298 meshing with the teeth of gear 86 on the turbine member. Gear 298 is mounted to have both rotating and sliding movement relative to the valve rod 300. Drive from the gear to the valve rod is effected by means of friction plates 302 loaded by means of spring 304. The valve rod 300 is provided with threads 306 at one end which engage similar threads provided in the hub of gear 296 and intermediate its ends the valve rod is provided with a recessed portion 308 for controlling flow of actuating pressure fluid to the brake operating member 292.

Referring now more particularly to Fig. 11, it will be seen that the pressure pipe 162 leading from pump 152 is provided with a branch 162a leading to a third section of the master valve member 168 which controls communication between this branch and the conduit 310 leading to the shift valve 294. From the latter, conduit 312 leads to the brake operating member 292. A vent conduit 314 is also provided leading from the valve chamber of valve 294.

The manner in which the above described mechanism operates to effect shift from double rotation operation to single rotation operation and vice versa is as follows. As will be evident from Fig. 9, gear 296 rotates in a direction counter to that of the pump and gear 298 rotates in a direction counter to that of the turbine member whenever the latter is moving. If we now consider the conditions at starting, the gear 296, being driven from the rotating casing 16, is in motion while the gear 298, meshing with the stationary turbine member, is also stationary, but is in frictional drive relation with the valve rod 300 due to the friction discs 302. Consequently, due to the friction force exerted by gear 298 and tending to keep the valve rod rotationally stationary while gear 296 turns, the rod is forced to the right as viewed in Fig. 9 (downwardly as viewed in Fig. 11) to the limit of its travel in this direction, which is established by collar 300a. In this position of the valve, pressure fluid is cut off from the brake 286 and the pressure chamber of the brake is vented due to the fact that conduits 310 and 314 are connected through the valve recess 308.

As the turbine member begins to rotate, gear 298 is rotated in the same direction as gear 296. From Fig. 9 it will be seen that the speed ratio between the pump member and gear 296 is much lower than the speed ratio between the turbine member 28 and gear 298. In the embodiment illustrated the former is substantially a one to one ratio whereas the latter is of the order of a three to one ratio. Consequently, as the speed of the turbine member increases, the speed of gear 298 increases much more rapidly, and at a speed ratio between the pump and turbine members of the converter which is relatively low, for example usually in the neighborhood of from 0.25 to 0.30, the speeds of gears 296 and 298 will be equalized. During this period the converter will operate as a double rotation converter, the reaction blades 44 rotating counter to the direction of the pump and in effect constituting counter-rotating turbine blades delivering power through the planetary gearing to the output member of the transmission. As the speed of the turbine member relative to the pump further increases, the speed of gear 298 will exceed that of gear 296 and due to the friction drive will tend to overdrive the valve rod 300 relative to gear 296. This action causes the threaded connection between the valve rod and gear 296 to shift the valve rod axially to the right as viewed in Fig. 9 (downwardly in Fig. 11) to its opposite limit position, which is as shown in the figures and in which the brake operating member is placed in communication with the pressure conduit 310 for engagement of the brake. Engagement of the brake operates to lock the reaction member to the stationary housing and thereafter the converter operates in the higher speed range as a single rotation converter with stationary reaction or guide blades. Under this condition of operation the sun gear of the planetary gearing is stationary while the ring gear rotates with the turbine member. This necessitates the planet carrier also rotating in the forward direction of the turbine member, but as previously noted this action is permitted by the overrunning brake elements 284.

From the above it will be apparent that if the turbine member slows down relative to the pump member so as to cross the so called shift point or shift speed, with the result that gear 298 rotates more slowly than gear 296, the shift valve will again be moved to a position cutting off the supply of operating fluid to the brake and venting the pressure to permit its release.

In the embodiment illustrated, the double rotation and single rotation operation of the converter is also combined with a direct drive and with a reversing mechanism essentially the same as that previously described in connection with Fig. 1. As will be seen from the drawings the pressure conduit 172 leading from the master control valve communicates with the chamber 182 and, through ports 190 and 192, is placed in communication with the hydraulic chamber 24.

The pressure conduit 170 communicates through a port 170a in the sleeve 50 of the reaction member to the space between this member and the turbine member, from which space communication is established through channels 106 and 204 to the chamber 200 and from the latter actuating fluid is delivered to the direct drive clutch 72.

In the present arrangement the channel 186 leading to the radial conduits 210 for supplying pressure fluid to the control valves 124 is in communication with pressure conduit 170, rather than in communication with the pressure conduit 172 as in the embodiment shown in Fig. 1. This gives the result that when in hydraulic drive only the lower or return pressure of the hydraulic fluid is admitted to the synchronizing clutch, but sufficient pressure may be maintained even under this condition to enable this clutch to be operated.

When in direct drive the reaction member obviously must be permitted to rotate in the same direction as the pump and turbine members, and in the embodiment illustrated in Fig. 1 this is automatically accomplished through the action of the overrunning clutch by means of which the reaction member is held against counter-rotation but is permitted freely to rotate in forward direction. In the present embodiment the friction clutch or brake which holds the reaction member against rotation during single rotation operation of the converter must be released whenever shift to direct drive is made, and this is accomplished automatically by providing the valve housing 166 of the master control valve 164 with a vent port 316 located to be blocked from communication with the pressure channel 310 leading to the valve 294 whenever the master valve is in the position corresponding to hydraulic drive but arranged so as to be placed in communication with the conduit 310 whenever the master valve is moved to the position providing direct drive. Thus, regardless of the position of valve 294, the fluid actuated brake for holding the reaction member stationary is relieved of pressure whenever direct drive is established so that the brake is disengaged and the reaction member is enabled to rotate freely in the same direction as the pump and turbine members. Under direct drive conditions the pump and turbine members rotate forwardly at the same speed which requires that the planet carrier of the planet gear connecting these members also rotate forwardly at the same speed. This is permitted by the action of the overrunning clutch 284 which overruns under direct drive conditions in a manner similar to that which occurs when the apparatus is set for single rotation converter drive.

Because of the difference in the clutch construction required in order to employ double rotation operation, the automatic shifting arrangement for effecting direct drive under the influence of the movable ring 62 and the operating rod 68 (Fig. 2) associated with the overrunning clutch is omitted, the shift from converter operation to direct drive and vice versa being effected through the medium of operation of the mechanism actuated by movement of the lever 234, which may readily be actuated automatically in response to predetermined conditions indicative of little or no torque increase through the hydraulic drive so that a shift to direct drive is indicated.

While for the purpose of illustrating the principles of the invention in its various aspects, particular forms of converter mechanism have been chosen by way of example, it will be apparent that many changes in the form and construction of the apparatus may be made without departing from the spirit and scope of the invention and that certain of the features of the invention may be employed to the exclusion of others. It is therefore to be understood that the invention includes all forms of apparatus falling within the scope of the appended claims.

The generic subject matter and subject matter specific to the single rotation form of converter illustrated in Figs. 1 to 8 inclusive is claimed in my co-pending continuation-in-part application Serial No. 100,041, filed June 18, 1949, the claimed subject matter in this application being restricted to the double rotation form of apparatus which is not embodied in the disclosure in the aforesaid continuation-in-part application.

What is claimed:

1. A power transmission comprising a hydraulic variable speed torque converter having rotatably mounted driving and driven members and a rotatably mounted reaction member, rotationally stationary means, gearing interconnecting said reaction and driven members for rotation of the reaction member in a direction counter to that of the driven member by hydraulically applied reaction torque, means comprising a brake associated with said gearing engageable to cause reaction torque to be transmitted to said stationary means when the reaction member rotates in said counterdirection and disengageable to permit the reaction member to come to rest and to rotate in the same direction as the driven member while the driven member is rotating, means providing an alternative driving connection between said driving and driven members including a fluid pressure actuated driving clutch, a fluid pressure actuated locking brake for connecting said reaction member and said stationary means, and means for supplying operating fluid to said driving clutch and to said locking brake comprising control valve means constructed to selectively engage and disengage said brake in accordance with predetermined operating conditions when said driving clutch is disengaged and to insure release of said brake whenever said driving clutch is engaged.

2. A transmission as set forth in claim 1 in which said control valve means includes a shift valve movable from a first position for effecting disengagement of the locking brake to a second position for effecting engagement of the brake and a master valve movable from a first position for effecting disengagement of the driving clutch to a second position for effecting engagement of the driving clutch, said master valve including means for cutting off the supply of operating fluid to said shift valve whenever the master valve is moved to its said second position.

3. A transmission as set forth in claim 2 including an automaticaly operable quotient regulator responsive to variations in the ratio of the speed of the driven member to that of the driving member for positioning said shift valve in its said first position when said ratio is below a predetermined value and positioning said shift valve in its said second position when said ratio exceeds said value.

4. In a power transmission, a hydrodynamic torque converter having driving, reaction and driven members selectively operable in a single hydraulic circuit to transmit power in different torque converting driving relations from the driving to the driven member, a fluid pressure actuated control system including a control valve movable to different positions for controlling the flow of pressure fluid to provide in alternation said different torque converting driving relations between said members, a first element rotatable at a speed indicative of the speed of the driving member, a second element rotatable at a speed indicative of the speed of the driven member, and means operatively connecting both of said elements with said control valve for causing the control valve to move from one to the other of said positions when the speeds of said elements cross.

5. Apparatus as defined in claim 4 in which said control valve is turnably mounted and is frictionally connected with one of said rotatable elements to be turned thereby.

6. Apparatus as defined in claim 4 in which said control valve is rotatably mounted and axially shiftable between said positions, and in which driving connections are provided between said elements and said valve and said driving connections including a friction connection between one of said elements and said valve for turning the latter and a connection between the other of said elements and said valve for axially shifting the valve when the speeds of said elements cross.

7. A hydrodynamic torque converter constructed for alternative operation as a single rotation or double rotation converter for transmitting power from a driving member to a driven member including rotatably mounted reaction and turbine wheels, means for transmitting torque in the same direction to said driven member from said wheels while the wheels are rotating in opposite directions, releasable braking means for holding said reaction wheel rotationally stationary, fluid pressure actuated means for causing engagement of said braking means including a control valve and means responsive to predetermine variations in the speed ratio between said driving and driven members for moving said valve to effect engagement or release of said braking means.

8. Apparatus as defined in claim 7 in which said control valve is turnably mounted and axially shiftable between two terminal positions to cause disengagement of said brake in a first position and to cause engagement of said brake in a second position and said means being operative to maintain the valve in said first position whenever the speed of the driven member relative to that of the driving member is below a predetermined ratio and to maintain the valve in said second position whenever said ratio exceeds said predetermined value.

References Cited in the file of this patent

UNITED STATES PATENTS

| Number | Name | Date |
|---|---|---|
| Re. 22,967 | Nutt | Jan. 27, 1948 |
| 1,960,705 | Kochling | May 29, 1934 |
| 1,970,236 | Kluge et al. | Aug. 14, 1934 |
| 2,005,444 | Weiss | June 18, 1935 |
| 2,018,616 | Martyrer | Oct. 22, 1935 |
| 2,037,252 | Martyrer | Apr. 14, 1936 |
| 2,089,590 | Walti | Aug. 10, 1937 |
| 2,134,398 | Cotterman | Oct. 25, 1938 |
| 2,222,618 | Jandasek | Nov. 26, 1940 |
| 2,302,714 | Pollard | Nov. 24, 1945 |
| 2,373,453 | Brunken | Apr. 10, 1945 |
| 2,374,303 | Osborne | Apr. 24, 1945 |
| 2,408,951 | Pollard | Oct. 8, 1946 |
| 2,442,840 | Carnagua | June 8, 1948 |
| 2,449,586 | Carnagua | Sept. 21, 1948 |
| 2,449,608 | Le May | Sept. 21, 1948 |
| 2,456,132 | Lapsley | Dec. 14, 1948 |
| 2,456,328 | Schneider | Dec. 14, 1948 |
| 2,568,007 | Jandasek | Sept. 18, 1951 |

FOREIGN PATENTS

| Number | Country | Date |
|---|---|---|
| 452,415 | Great Britain | Aug. 21, 1936 |